United States Patent
Dezonno

(10) Patent No.: US 6,771,764 B1
(45) Date of Patent: Aug. 3, 2004

(54) SCHEDULE BASED TRANSACTION ROUTING

(75) Inventor: Anthony J. Dezonno, Bloomingdale, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/491,828

(22) Filed: Jan. 26, 2000

(51) Int. Cl.[7] .............................................. H04M 5/00
(52) U.S. Cl. ......................... 379/265.02; 379/265.05; 379/265.09; 379/265.11; 379/265.14
(58) Field of Search ..................... 379/207.02, 207.03, 379/265.02, 265.03, 265.05, 265.06, 265.07, 265.08, 266.01, 309, 265.01, 265.09, 265.1, 265.11, 265.14, 266.03

(56) References Cited

U.S. PATENT DOCUMENTS

| | | | |
|---|---|---|---|
| 5,317,630 A | * 5/1994 | Feinberg et al. ......... | 379/93.06 |
| 5,365,582 A | * 11/1994 | Yamada et al. ......... | 379/266.07 |
| 5,828,747 A | * 10/1998 | Fisher et al. ........... | 379/265.12 |
| 5,903,641 A | * 5/1999 | Tonisson ................ | 379/265.12 |
| 6,163,607 A | * 12/2000 | Bogart et al. .......... | 379/266.01 |
| 6,356,632 B1 | * 3/2002 | Foster et al. ........... | 379/265.04 |
| 6,366,666 B2 | * 4/2002 | Bengtson et al. ...... | 379/265.06 |
| 6,453,038 B1 | * 9/2002 | McFarlane et al. .... | 379/265.05 |
| 6,614,903 B1 | * 9/2003 | Flockhart et al. ...... | 379/265.12 |

* cited by examiner

*Primary Examiner*—Bing Bui
(74) *Attorney, Agent, or Firm*—Welsh & Katz, Ltd.

(57) ABSTRACT

A method and apparatus are provided for reducing deviations between worked hours of an agent and a schedule of hours for the agent. The method includes the steps of determining a metric comparing a work status of the agent during a time period with a scheduled status of the schedule of hours and comparing the metric with an agent call assignment threshold and when the agent call assignment threshold exceeds the determined metric, preferentially assigning calls to other agents.

36 Claims, 2 Drawing Sheets

Fig. 2

WORK SCHEDULE

| | START SHIFT | END SHIFT | LUNCH BREAK | REST #1 | BREAKS #2 | ASSIGNMENT |
|---|---|---|---|---|---|---|
| BOB | 8:00 AM | 4:30 PM | 12:00 PM | 9:30 AM | 2:00 PM | CALLS |
| DICK | 8:00 AM | 4:30 PM | 12:30 PM | 9:45 AM | 2:15 PM | CALLS |
| JANE | 7:30 AM | 4:00 PM | 11:30 AM | 9:15 AM | 1:30 PM | CALLS |
| BILL | 7:00 AM | 3:30 PM | 11:00 AM | 9:00 AM | 1:00 AM | PAPER |
| SUE | VACATION | | | | | |

50

SCHEDULE BASED TRANSACTION ROUTING

FIELD OF THE INVENTION

The field of the invention relates to telephonic communication systems and more particularly to automatic call distributors.

BACKGROUND OF THE INVENTION

Automatic call distribution systems are known. Such systems are typically used in an organizational context as a means of distributing telephone calls among a group of agents of the organization. Agents are typically segregated into groups to serve particular call targets of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In other systems, where skill is considered essential for call handling, a call may be directed to an agent (or agent group) considered the most skilled for the call considered. In these systems, a database of customer records is maintained. Customers are identified to the ACD and database by features such as automatic number identifier (ANI).

In order to staff an ACD, an organization often relies on historical levels (in Erlangs) of incoming calls to the individual call targets. A manager of the ACD may examine the historical call loading records, add or subtract a percentage of the historical loading based upon a most recent call history (e.g., the most recent week or month), and estimate a staffing level based upon those calculations. Alternatively, some organizations have relied upon commercially available predictive software (i.e., force management packages) which calculates daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group is separately staffed based upon an Erlang estimate for that group.

Once a staffing schedule is established, agents report for work as scheduled and sign into the ACD. Once signed in, the ACD continuously assigns calls based upon the currently used assignment algorithm. Such algorithms do not typically accommodate the preferences or needs of the agents.

For example, as an agent approaches an end of his shift, he may receive a call, which extends past the end of the agent's shift. Such calls may not only inconvenience the agent, but may also result in overtime pay without a supervisor's knowledge or authorization.

Further, supervisors may set staggered break schedules for their agents to ensure sufficient telephone coverage during break periods. Unfortunately, the variable nature of call arrivals may disrupt the schedule, again resulting in overtime or missed breaks. Because of the importance of ACDs, a need exists for a means of coordinating call delivery to agents with the needs and work schedules of the agents.

SUMMARY

A method and apparatus are provided for reducing deviations between worked hours of an agent and a schedule of hours for the agent. The method includes the steps of determining a metric comparing a work status of the agent during a time period with a scheduled status of the schedule of hours and comparing the metric with an agent call assignment threshold and when the agent call assignment threshold exceeds the determined metric, preferentially assigning calls to other agents.

BRIEF DESCRIPTION OF THE DRAWINGS

FIG. 2 is a schedule that may be used by the system of FIG. 1.

DETAILED DESCRIPTION OF A PREFERRED EMBODIMENT

Figure 1:
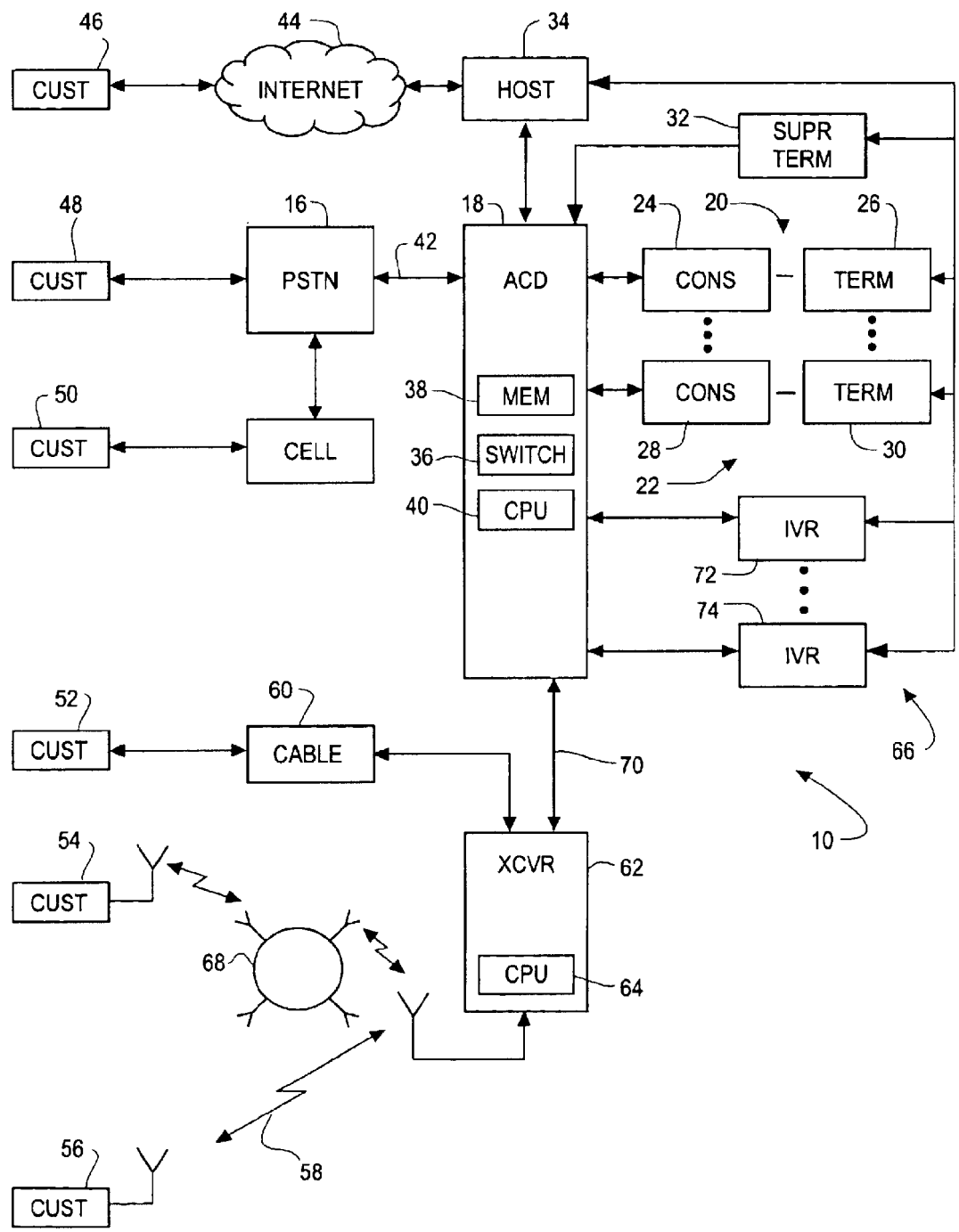
FIG. 1 is a block diagram of a transaction processing system in accordance with an illustrated embodiment of the invention.

FIG. 1 depicts a transaction processing system 10 in accordance with an illustrated embodiment of the invention. Such a system 10 may be used to route calls from any of a number of sources (e.g., through the PSTN, Internet, e-mail, cellular telephone system, cable TV system, radio, satellite, etc.). As used herein, a call may be based on a switched circuit connection (i.e., through the PSTN) or a packet connection (e.g., through the Internet). A switched circuit connection (also sometimes referred to simply as a "telephone connection" in the telephony arts) refers to a dedicated channel existing between two parties. As used herein, a packet connection does not represent a physical connection, but simply the possession and concurrent use by two users of the other user's IP address.

Under the illustrated embodiment, calls may be received from customers 46, 48, 50, 52, 54, 56 and be routed to a selected transaction processing entity 66 (e.g., agent stations 20, 22 or interactive voice response units (IVRs) 72, 74) by the transaction processing system 10.

For example, each agent station 20, 22 may include a telephone console 24, 28 and a terminal 26, 30. Switched circuit calls with customers 48, 50, 52, 54, 56 placed through the ACD 18, may be routed by matrix switch 36 of the ACD 18 to a console 24, 28 of the agent 20, 22.

Calls through the Internet 44 may occur as e-mail or as voice over IP (VOIP). In either case, the host 34 may route the call to a terminal 26, 30 of an agent 20, 22 or to an appropriate IVR 72, 74.

A customer 46, 48, 50 may use a conventional telephone or cell phone and/or a computer to place/receive a call with the transaction processing system 10. Alternatively, the customer 52 may place/receive a call using an interactive channel of a community antenna television (CATV) system 60, land mobile radio 56 or a transmission channel of a satellite 68. Where the customer 52, 54, 56 places a call using an interactive channel of a community antenna television (CATV) system 60, land mobile radio 56 or a transmission channel of a satellite 68, it may be assumed that such call is initiated by the entry of a target identifier (e.g., a telephone number of the ACD 18) using a conventional touch-tone pad.

For simplicity, reference to an agent herein shall be to the agent station 20, 22 without regard to the device 24, 26, 28, 30 actually used by the agent. Similarly, reference to a customer herein shall be to a station 46, 48, 50, 52, 54, 56 of the customer without regard to the device actually used.

While the term "caller" may herein sometimes by used to refer to the customer 46, 48, 50, 52, 54, 56, it should be understood that calls may just as well be initiated by the transaction processing system 10. For example, customer lists may be maintained in a database of the host 34. Outgoing calls from the system 10 may be initiated to the customers 46, 48, 50, 52, 54, 56 by the CPU 40 through the PSTN 16, radio frequency (rf) transceiver 62 or by the host 34 through the Internet 34.

Associated with each customer 46, 48, 50, 52, 54, 56 may be an identifier and call routing information. The identifier may be an identifier used for identifying the customer 46, 48, 50, 52, 54, 56 within a particular communication system (e.g., a telephone number within the PSTN 16, an IP address within the Internet 44, a customer account number within the CATV system 60, an electronic serial number (ESN) within the land mobile radio 56 or satellite system 56, etc.).

The routing information may be used to identify the particular system (e.g., PSTN 16, Internet 44, CATV 60, land mobile radio 56, satellite 68, etc.) within which the identifier is to be used. In the case of the transaction processing system 10, the routing information may simply identify the port through which the call is to be processed. For example, a port for an Internet call may be an Internet connection with the host 34. A telephone call may be processed through a first set of trunk connections 42 using a respective port of a switch 36 of the ACD 18. A call with a cable subscriber 52, land mobile user 56 or satellite customer 54 may be processed through a second set of trunk connections 70 using a respective port of the switch 36 of the ACD 18. The identifier and call routing information may, together, be referred to herein as call associated information.

Whether a call is incoming or outgoing, the distribution of the call may be substantially the same and may be based upon a call classification system. When the call is outgoing, the transaction processing system 10 inherently knows the identity of the call target. When the call is incoming, the transaction processing system 10 may determine the identity of the caller based upon the call associated information (e.g., a port number and ANI or IP address information in the case of the PSTN or Internet). By knowing the identity of a customer 46, 48, 50, 52, 54, 56 the transaction processing system 10 may classify the call based upon the historical needs of the customer 46, 48, 50, 52, 54, 56 or some other well-known criteria.

Blind incoming calls, on the other hand, may be classified based upon DNIS numbers of a PSTN caller or the IP address of a website visitor or e-mail query. Cable, land mobile or satellite callers may be classified based upon a geographical location of the transceiver 62 processing the call and local mass media promotions. The bi-directional nature of transaction processing of calls herein may be reflected by using the phase "calls with customers 46, 48, 50, 52, 54, 56".

Calls with customers 46, 48, 50, 52, 54, 56 may be routed to transaction processing entities (e.g., agents) based upon one of two formats. Under a first format, a call may be detected by the ACD 18 as a switched circuit formed through the PSTN 16. Calls received under the first format are typically delivered along with call associated information (e.g., DNIS, ANI,.ESN, switch port number, etc.). Call associated information may be used by a CPU 40 as a means of classifying the call. Calls may be classified based upon any of a number of predetermined criteria (e.g., the number called, the identity of the caller, the local of the caller, the time of day, etc).

Calls with customers 46 under the second format occur through the Internet. As with switched circuit calls, the host 34 would inherently know the identify of outgoing calls. Since the host 34 would know the identity of outgoing calls, the host 34 can easily: classify the call based upon customer records.

Incoming calls through the Internet may also be classified by the host 34 based upon call associated information (i.e., the IP address of the caller 46). If the caller 46 is an existing customer, the host 34 can identify the customer in its database using the IP address of the caller as a search term. As above, historical records of the customer may be used as a basis for classifying the call. If the caller 46 is not an existing customer, then the host 34 may classify the caller 46 based upon the context of the call (e.g., an identity of a website visited, a webpage from which a query originates, an identity of the e-mail address within the system 10 which receives a query, etc.).

Because Internet calls and PSTN calls may be distributed to a common set of agents 20, 22 the CPU 40 and host 34 may need to coordinate their efforts in distributing calls. When an Internet call is received, the host 34 may consult an internal list of available agents or retrieve a list of available agents 20, 22 from the CPU 40 of the ACD 18. From that list, the host 34 may select the most qualified agent for assignment to the call. Upon selection of the agent, the host 34 transfers the call to the selected agent 20, 22. When a call is assigned by the host 34, the host 34 sends notification to the CPU 40 of the ACD 18. Notification of a call assignment by the host 34 causes the CPU 40 to remove that agent from its list of available agents.

Similarly, when the CPU 40 assigns a call, the CPU 40 may send notification to the host 34. Using this method, the CPU 40 and host 34 may each maintain a list of available agents 20, 22. From the list of available agents 20, 22, an agent may be selected for each new processed call.

Call delivery to a transaction processing entity 20, 22, 72, 74 may be accomplished under several formats. Where the call is a switched circuit call, the CPU 40 selects an entity and delivers the call to the console 24, 26 of the selected agent 20, 22 or to the selected IVR 72, 74. The CPU 40 may send a call delivery message including the call associated information to the host 34. Where the host 34 is able to identify customer records, the host 34 may present those records to the selected call processing entity 20, 22 at the instant of call delivery (e.g., as a screen pop on a terminal 26, 30 of the selected agent).

Where a call is through the Internet, presentation may be entirely through the terminal 26, 30 of the selected agent. E-mail messages may be forwarded in their entirety to the selected agent. Where the call is in the form of a web telephony call, the host 34 may forward the IP address of the requestor to the selected agent. Where the host 34 is able to identify customer records, those records may be presented to the agent along with the e-mail, web telephony request or Internet query.

Selection of an agent for a call may be made based upon a call classification and a minimum content level (e.g., minimum agent skill level) requirement determined for that classification. Inherently, a voice-based call using a switched circuit connection or web telephony call would have a different minimum skill requirement than an e-mail call because of the verbal abilities required by the voice-based call.

In general, a supervisor working through a supervisors terminal 32 may evaluate a skill of each agent 20, 22. The skill evaluated by the supervisor may be against a number of different criteria. More specifically, the supervisor may enter a skill for each agent 20, 22 with regard to each call classification. For example a first call classification may be with regard to identified customers. The supervisor may evaluate the skill of each agent based upon a knowledge of the technological needs of the customers 46, 48, 50, 52, 54, 56 and upon each agent's skill in dealing with customers 46, 48, 50, 52, 54, 56.

Where a call classification is of a blind call from an unknown customer 46, 48, 50, 52, 54, 56, the supervisor may evaluate the skill of each agent based upon a broad understanding of the ACD owner's products. A skill of each agent with regard to certain languages (e.g., Spanish) may be provided for calls associated with areas with a large Hispanic population.

In addition to evaluating the skills of each agent, the supervisor may also set a minimum skill level for each call type. Further, some call types may include a combination of minimum skill levels.

Based upon a call classification, the host 32 may also assign an IVR 72, 74 to a call. Based upon the call classification, the host 34 may also specify the minimum content requirement for use by the IVR 72, 74 in processing the call. Minimum content requirement, in the content of the IVR 72, 74 may be provided by the IVR application used to service the call.

For example, IVR applications may be written based upon language and subject matter. Calls of a first call classification may be written to provide verbal prompts in a first language which calls of a second classification may be written to provide verbal prompts in a second language.

Further, based upon the caller, an IVR application may present choices based upon a caller's previous buying habits or local mass media promotions. In any case, the caller may be presented with a set of options, which options the caller may select by activation of a button on his touch tone phone. Depending upon the sophistication of the IVR application, information may be collected in anticipation for assignment to an agent 20, 22 or the entire transaction may be completed without human intervention.

Agents may become available to accept calls in any of a number of ways. At a most basic level, a supervisor working through a supervisors station 32 may determine a number of agents needed for any given time period using his own personal knowledge or a force management package running on the host 34 or CPU 40.

The force management package may determine an overall number of agents required by the ACD 18 or the number of agents required-by each group. Once a number is determined, the supervisor may specify the specific agents needed for each group based upon his own personal knowledge or upon a skill mix provided by the force management package. Using the workforce management package, the supervisor may create a work schedule 50 (FIG. 2) for any particular time period.

When directed by the work schedule, an agent may identify himself/herself as available for taking calls at a beginning of a shift by signing onto a workstation 20, 22. Signing on may include entering a personal identification number (PIN) through a terminal 26, 30 or by calling a predetermined number of the ACD 18 using the agent telephone 24, 28 and stating the agent's name or, again, by entry of the agent's PIN number.

Once signed into the ACD 18, calls may be routed based upon any number of criteria. As described above, calls may be routed based upon which agent has been idle the longest, or based upon a predetermined skill of the agent. Skill may be measured based upon knowledge of the subject matter of the call target of the caller 12, 14 or upon knowledge of the interests of the caller 12, 14.

Under the illustrated embodiment, incoming calls from callers 12, 14 may be assigned (or not assigned) based upon any of a number of different criteria. For instance, it has been found that deviations between work performance of an agent and the agent's schedule may be minimized by considering certain factors regarding the agent's work environment.

For example, a work status of an agent may be compared with a scheduled status to determine whether a call should, or should not, be assigned to an agent. A work status of an agent may be determined based upon a number of hours worked or calls handled per time period. Similarly, a scheduled status may also be measured in terms of a number of hours to be worked or calls handled. Where an agent handles a large number of calls during a time period, it may be an indication that the agent should be given a breather in terms of the workload to reduce the likelihood of agent burnout. In such a situation, a maximum call threshold on the number of calls assigned per time period (e.g., per hour) may be used as a criteria for directing additional calls to other agents.

Similarly, were an agent is approaching an event change (e.g., the end of shift), the assignment of. additional calls may result in a schedule deviation. The event change defines a significant factor regarding the agent's work status, which may be considered in the assignment of calls to the agent. In general, work status means any state within which the agent resides which effects his ability to accept calls from the ACD. For example, an agent may be on vacation, or on break, or the agent may be assigned to do paperwork instead of accepting calls. Where the agent is on vacation or on break, he would clearly not be in a state to accept calls. Similarly, while the agent in doing paperwork, the ACD may only assign calls to the agent when a need arises.

Further, the agent's scheduled status with regard to the work schedule may affect his ability to receive calls. For instance, and as mentioned above, an agent assigned to do paper work (e.g., order forms, work summaries, etc.) would not normally be available to accept incoming calls (e.g., see for example, Bill in line #4 of FIG. 2). In general, an agent's scheduled status means any factor regarding the work schedule or regarding creation or philosophy of the work schedule, which affects a decision to assign calls to the agent. For example, an agent scheduled for vacation (e.g., Sue on line #5 of FIG. 2) would have a scheduled status which does not allow assignment of calls to the agent during the vacation.

Under the illustrated embodiment, a metric may be determined which considers the work status and scheduled status of the agent and which provides a basis for determining whether or not to assign a call to the agent. In the case of the vacationing agent, the metric may be a nominal factor based upon the scheduled status. In the case of the agent assigned to do paperwork, the metric may be related to a call queue length of his work group. Since customer satisfaction would normally be considered of primary importance, agents assigned to paperwork would normally be diverted to handling calls where customer satisfaction may be in jeopardy.

In general, determining a metric comparing a work status with a scheduled status may be determined by any of a number of different methods. In the case of the agent assigned to paperwork, the metric may be a call queue length. The determined metric may also be a time remaining until a status change event. Where the agent is approaching an assigned break time or vacation period, the ACD would not assign calls to the agent immediately before or during that scheduled time.

In general, a threshold value may be used in conjunction with any determined metric as a basis for assigning calls. For example, in the case of a status change, a predetermined time period may be used as threshold value for determining whether to assign calls.

More specifically, Bob in line #1 of FIG. 2 is shown to have an assigned lunch break starting at 12:00 p.m. If the predetermined time period for Bob's group is 5 minutes, then the CPU 40 would not assign calls to Bob after 11:55 am.

Bob's work status in this example is that of taking calls. The scheduled status may be defined by the scheduled lunch break at 12:00 pm. The metric measured by the CPU 40 may be the time remaining until the beginning of the lunch break. The CPU 40 may compare the measured time against the predetermined time period and when the predetermined time period exceeds the remaining time, the CPU 40 may assign incoming calls to other agents.

Sue's vacation shown in line #5 of FIG. 2 may be handled in a similar manner. For instance, in a first step the CPU 40 (by reference to the work schedule in memory 38) may recognize the advent of a vacation period from Sue's work status and scheduled status. In this case, the measured metric may be the time remaining until the vacation is over. The threshold may be a value calculated to exceed the measured value at the end of the vacation period.

Call assignment to Bill of line #4 of FIG. 2 may be handled as suggested above. Since Bill has a scheduled status of "working" and a related work status of doing "paperwork", the CPU 38 determines that Bill is available for call assignment. In determining whether to assign calls to Bill, the CPU 38 measures an average queue length of the work group to which Bill belongs as a factor related to Bills work status and scheduled status. The CPU 38 compares the average queue length with a maximum queue length. When the average queue length is short, the maximum queue length threshold is larger and calls are preferentially assigned to others. When the queue length is larger than the maximum queue length threshold, then the CPU 38 assigns calls to Bill.

In another illustrated embodiment of the invention, the method may be used in a global context to control creation of work schedules. For example, an agent may be given a yearly goal for worked hours. The yearly goal may be used as a minimum hours requirement or as a trigger point for bonuses. The agent's work status with regard to this goal may be provided by the number of hours which the agent has worked during a first portion of the year. The available number of weeks or days left in a second portion of the year, considering any vacations or planned leave may provide a status of any scheduling opportunities. The calculated number of hours in those remaining weeks or days necessary to achieve that goal may provide a performance metric necessary to meet that goal. The calculated hours may provide a threshold value which, on the one hand allows the agent to meet that goal, yet on the other hand allows extra hours to be assigned to other agents, thereby reducing overall costs to the ACD operator.

A specific embodiment of a method and apparatus for performing scheduled based transaction routing according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of reducing deviations between worked hours of an agent and a schedule of hours for the agent of a transaction processing system, such method comprising the steps of:

determining a metric relating a work status of the agent during a time period with a scheduled status of the agent for the schedule of hours where the determined metric is not based upon an average call handling time and where the work status of the agent for a call handling rate is only based upon a maximum call threshold on the number of calls assigned to the agent per time period to avoid burnout of the agent; and comparing the determined metric with an agent call assignment threshold and when the determined metric and the agent call assignment threshold exceeds the determined metric, assigning calls to the agent based upon the work status of the agent.

2. The method of reducing deviations as in claim 1 wherein the step of determining a metric further comprises determining a time value remaining between a current time and a status change event.

3. The method of reducing deviations as in claim 2 wherein the status change event further comprises an end of shift.

4. The method of reducing deviations as in claim 2 wherein the status change event further comprises a lunch period.

5. The method of reducing deviations as in claim 2 wherein the status change event further comprises a rest break period.

6. The method of reducing deviations as in claim 2 wherein the status change event further comprises a vacation period.

7. The method of reducing deviations as in claim 2 further comprising determining the call assignment threshold by subtracting an predetermined time period for incoming telephone calls to the transaction processing system from a clock-provided time of the status change event.

8. The method of reducing deviations as in claim 1 wherein the step of determining the metric of the agent by comparing the work status with the scheduled status further comprises determining that the agent has been given a non-call-handling work assignment.

9. The method of reducing deviations as in claim 8 wherein the step of determining the metric of the non-call-handling agent further comprises determining a call queue length of a call group of the agent.

10. The method of reducing deviations as in claim 9 further comprising determining the call assignment threshold using a maximum call queue length for the call group.

11. The method of reducing deviations as in claim 1 wherein the determined metric further comprises a number of calls per time period assigned to the agent.

12. The method of reducing deviations as in claim 1 wherein the determined metric further comprises a number of hours per time period worked by the agent.

13. Apparatus for reducing deviations between worked hours of an agent and a schedule of hours for the agent of a transaction processing system, such apparatus comprising:

means for determining a metric relating a work status of the agent during a time period with a scheduled status of the agent for the schedule of hours where the metric is not based upon an average call processing time and where the work status of the agent for a call handling rate is only based upon a maximum call threshold on the number of calls assigned per time period; and means for comparing the metric with an agent call assignment threshold and when the determined metric and the agent call assignment threshold exceeds the determined metric, assigning calls to other the agent based upon the work status of the agent.

14. The apparatus for reducing deviations as in claim 13 wherein the means for determining a metric further comprises means for determining a time value remaining between a current time and a status change event.

15. The apparatus for reducing deviations as in claim 14 wherein the status change event further comprises an end of shift.

16. The apparatus for reducing deviations as in claim 14 wherein the status change event further comprises a lunch period.

17. The apparatus for reducing deviations as in claim 14 wherein the status change event further comprises a rest break period.

18. The apparatus for reducing deviations as in claim 14 wherein the status change event further comprises a vacation period.

19. The apparatus for reducing deviations as in claim 14 further comprising means for determining the call assignment threshold by subtracting an predetermined time period for incoming telephone calls to the transaction processing system from a clock-provided time of the status change event.

20. The apparatus for reducing deviations as in claim 13 wherein the means for determining the metric of the agent by comparing the work status with the scheduled status further comprises means for determining that the agent has been given a non-call-handling work assignment.

21. The apparatus for reducing deviations as in claim 20 wherein the means for determining the metric of the non-call-handling agent further comprises means for determining a call queue length of a call group of the agent.

22. The apparatus for reducing deviations as in claim 21 further comprising means for determining the call assignment threshold using a maximum call queue length for the call group.

23. The apparatus of reducing deviations as in claim 13 wherein the determined metric further comprises a number of calls per time period assigned to the agent.

24. The apparatus reducing deviations as in claim 13 wherein the determined metric further comprises a number of hours per time period worked by the agent.

25. Apparatus for reducing deviations between worked hours of an agent and a schedule of hours for the agent of a transaction processing system, such apparatus comprising:

a metric processor adapted to determine a metric relating a work status of the agent during a time period with a scheduled status of the agent for the schedule of hours where the metric is not based upon an average call processing time and where the work status of the agent for a call handling rate is only based upon a maximum call threshold on the number of calls assigned per time period; and a comparator adapted to compare the metric with an agent call assignment threshold and when the determined metric and the agent call assignment threshold exceeds the determined metric, assigning calls to the agent based upon the work status of the agent.

26. The apparatus for reducing deviations as in claim 25 wherein the means for determining a metric further comprises means for determining a time value remaining between a current time and a status change event.

27. The apparatus for reducing deviations as in claim 26 wherein the status change event further comprises an end of shift.

28. The apparatus for reducing deviations as in claim 26 wherein the status change event further comprises a lunch period.

29. The apparatus for reducing deviations as in claim 26 wherein the status change event further comprises a rest break period.

30. The apparatus for reducing deviations as in claim 26 wherein the status change event further comprises a vacation period.

31. The apparatus for reducing deviations as in claim 26 further comprising threshold processor adapted to determine the call assignment threshold by subtracting an predetermined time period for incoming telephone calls to the transaction processing system from a clock-provided time of the status change event.

32. The apparatus for reducing deviations as in claim 25 wherein the metric processor further comprises a work assignment processor adapted to determine that the agent has been given a non-call-handling work assignment.

33. The apparatus for reducing deviations as in claim 32 wherein the metric further comprises a queue processor adapted to determine a call queue length of a call group of the agent.

34. The apparatus for reducing deviations as in claim 33 wherein the call assignment threshold further comprises a maximum call queue length for the call group.

35. The apparatus of reducing deviations as in claim 21 wherein the determined metric further comprises a number of calls per time period assigned to the agent.

36. The apparatus of reducing deviations as in claim 21 wherein the determined metric further comprises a number of hours per time period worked by the agent.

* * * * *